United States Patent
Henderson

[15] 3,659,071
[45] Apr. 25, 1972

[54] ARC CUTTING OF METALS AND METHOD OF CONTROL OF CUTTING DEPTH

[72] Inventor: R. Henderson, Lancaster, Ohio

[73] Assignee: Arcair Company, Allentown, Pa.

[22] Filed: July 27, 1970

[21] Appl. No.: 64,082

Related U.S. Application Data

[63] Continuation of Ser. No. 699,927, Jan. 23, 1968.

[52] U.S. Cl. ........................................ 219/69 G, 219/131
[51] Int. Cl. ................................................... B23p 1/14
[58] Field of Search ............ 219/68, 69 D, 69 E, 69 G, 69 M, 219/69 R, 69 V, 70, 75, 124–126, 130, 131

[56] References Cited

UNITED STATES PATENTS

| | | | |
|---|---|---|---|
| 1,061,612 | 5/1913 | Heroult | 219/69 G |
| 2,927,191 | 3/1960 | Matulaitis | 219/69 G |
| 2,526,423 | 10/1950 | Rudorff | 219/69 D |
| 3,100,255 | 8/1963 | Miller | 219/70 |
| 2,901,588 | 8/1959 | McKechnie | 219/69 G |

Primary Examiner—R. T. Staubly
Attorney—Beveridge & De Grandi

[57] ABSTRACT

Automatically controlled carbon arc cutting of metals by use of a gas jet to remove metal as it melts in the arc as cut is effected by a reversable motor-driven electrode adjustment according to sensed departures in arc voltage from a preset value. The arc is first struck and thereafter immediately adjusted to a desired depth of groove by sensing the departure of voltage across the arc from a set value to produce the desired depth for the finished groove bottom, which sensed deviation operates either of two switches to drive the electrode closer to or farther from the work to restore the arc voltage to the set value. A precision of cutting depth is achieved comparable to rough machining at a very high cutting rate for steel and metals not cut by ordinary machining operations. A tolerance of a few thousandths of an inch is maintained although irregularities in flatness or surface shape of the metal being cut would prevent predictable cutting depth for prior depth gauging methods.

11 Claims, 5 Drawing Figures

PATENTED APR 25 1972 3,659,071

INVENTOR

Harold R. Henderson

BY Browne, Schuyler & Beveridge

ATTORNEYS

ARC CUTTING OF METALS AND METHOD OF CONTROL OF CUTTING DEPTH

This application is a continuation of Ser. No. 699,927, filed Jan. 23, 1968.

It is known in the art of arc cutting and gouging of metal to apply a current from electrode to metal to cause melting of the metal, and further to blow out metal as it melts by the use of a high velocity gas jet impinging upon the work in the vicinity of the arc. It is also known to longitudinally adjust electrodes by means of a motor drive according to surface feelers so as to effect substantially an automatic operation of a torch mounted on a torch head which traverses the work in a continuous groove cutting operation. Jointed carbon electrodes having highly conductive copper coatings may be used such that individual sections of electrode may be added as consumed in any desired number for a continuous cut, being electrically connected together at conical nesting joints for effecting a continuous supply of electrode as it is consumed in the arc cutting process. Electrode material consumed is generally directly proportional to the mass of metal to be removed.

It is also known to control a consumable welding electrode by mechanically advancing the electrode in accordance with increasing arc spacing in order that the arc may not be extinguished by too great a spacing and to avoid excessive melting by too close a spacing as might be experienced whenever such an operation is manually adjusted with insufficient accuracy.

It has not heretofore been feasible to employ arc melting for operations requiring moderate accuracy of cut, as in planning or milling operations, or in cutting coarse threads, and the like because of the variable performance of arcs manually adjusted or adjusted by prior machine methods. Grinding has been employed for such operations where the work pieces are too hard for machining operations, while arc cutting has been used only for coarse or very rough metal gouging, although a more rapid and efficient operation would result if an accurate arc cutting method could be found.

It is accordingly an object of the present invention to provide a method of removing metal in controlled amounts to controlled depths more rapidly and in a less expensive manner than heretofore known.

It is another object of the invention to provide a method of controlling arc length at the striking of an arc and subsequent thereto for continuous cuts of substantially uniform depth in an automatic process.

A further object of the invention is to provide a metal removal process employing conventional equipment for the sensing of arc voltage changes and the control of groove depth by a simple adjustment, which depth is maintained regardless of motion of the workpiece to or from the electrode during a cutting operation.

These and other objects of the invention will be better understood as the description proceeds in connection with the drawings wherein.

SUMMARY OF INVENTION

Figure 1:
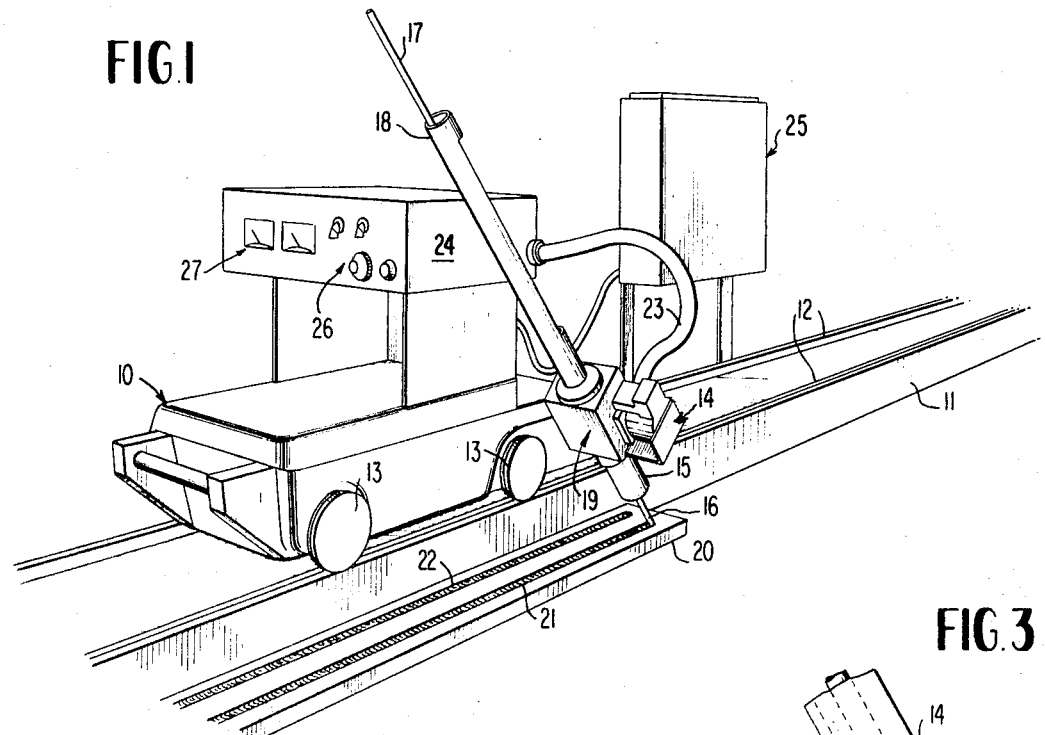
FIG. 1 is a diagrammatic sketch of suitable torch for practice of this invention.

In accordance with this invention the workpiece is placed beneath the head of a carbon arc cutting torch supplied with a jet of high velocity gas impinging upon the workpiece at the location of the arc. An automatic positioner therefor causes a striking of the arc by advancing the electrode toward the workpiece whenever no current passes and the arc has thereacross an excess of voltage above an adjusted working voltage, and withdraws the electrode whenever the arc voltage is less than the set value. Thus an arc is struck and immediately adjusted by an automatically operating control to a desired working voltage. A voltage and/or current sensor detects the existing voltage drop across the arc as an input signal to operate a control device actuating the electrode positioner.

In metal removal from a cylinder, e.g., threadcutting, a cylindrical workpiece may be rotated beneath the electrode while being advanced according to the pitch of the desired grooves. Accurate cutting by arc on a non-uniform or curved surface is generally ineffective unless a further control is used, since the arc may short or extinguish as the electrode moves to or from the work. By making the electrode positioner responsive to arc voltage a more uniform cut can be effected at a higher current without shorting or extinguishing the arc. Materials normally shaped by grinding because they are too hard for practical machining are thereby cut to substantially uniform depth of groove or by repeated passages may be cut to a desired depth as in a planing or milling operation. The desired current supply is from a source of "drooping voltage" type wherein the output voltage is an inverse function of the current drawn, in order that a voltage dependence upon arc length will be available throughout the operating range which is sensed and utilized in controlling the electrode spacing relative to the workpiece. This invention accordingly makes use of a characteristic of ordinary power supplies previously to be avoided for precision operations to effect by this invention a higher precision of cutting by means of spacing according to voltage variation rather than by controls to stabilize the voltage in the arc.

This invention is applicable to arc cutting by either an AC current or a DC current but obtains its greatest advantages when employing a DC current, and in what is referred to as "reversed polarity" for materials such as titanium, tungsten, and steel. When employing the so called "reversed polarity" the carbon electrode is made positive with respect to the workpiece. Voltage from the supply may be in the range of 35 to 45 volts, depending on load while the voltage across the arc is maintained preferably in the region of 38.0 to 40.0 volts as automatically controlled with variability 0.1 to 0.5 volt above and below a set value, generally below 40 volts. Under prior practice a nominal voltage above 40 volts has been used, which voltage varied more widely according to fortuitous positioning of electrode by mechanical or gauging adjustments of position, or as hand operated according to visual observation of arc conditions. This invention provides a process of depth control to a few thousandths of an inch tolerance, adjusted by electronic means to maintain accurate spacing and hence accurate cutting through voltage control and uniform current flow according to voltage measurement and readjustment to a set value from sensed departures either side thereof.

Control of electrode spacing in accordance with the voltage cross the arc permits a closer spacing of electrode to work, which, in turn permits higher current and faster cutting. A close spacing of electrode to work such as one hundredth of an inch has been subject to the disadvantage of shorting when this spacing deviates slightly from the desired setting, because of arc or surface irregularities normally occurring in a mechanically positioned arc. This interrupts the cutting action and causes a discontinuity to be produced in the groove, often with other results damaging to the machine. However, by an electronic control in which the sensed voltage departure is immediately reflected in a movement of the electrode to restore the preset voltage, a closer electrode adjustment can be reliably used without danger of shorting or of extinguishing the arc by excessive spacing. An increased current is then achieved at a lower arc voltage and the cutting rate is increased proportionately, while the uniformity of cutting depth is also improved to approximate a rough machining accuracy.

DETAILED DESCRIPTION

Figure 5:
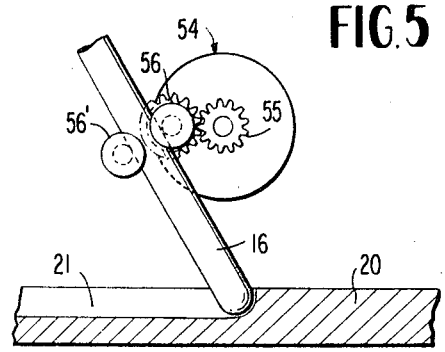
FIG. 5 is a detail diagram of the electrode drive.
Figure 4:
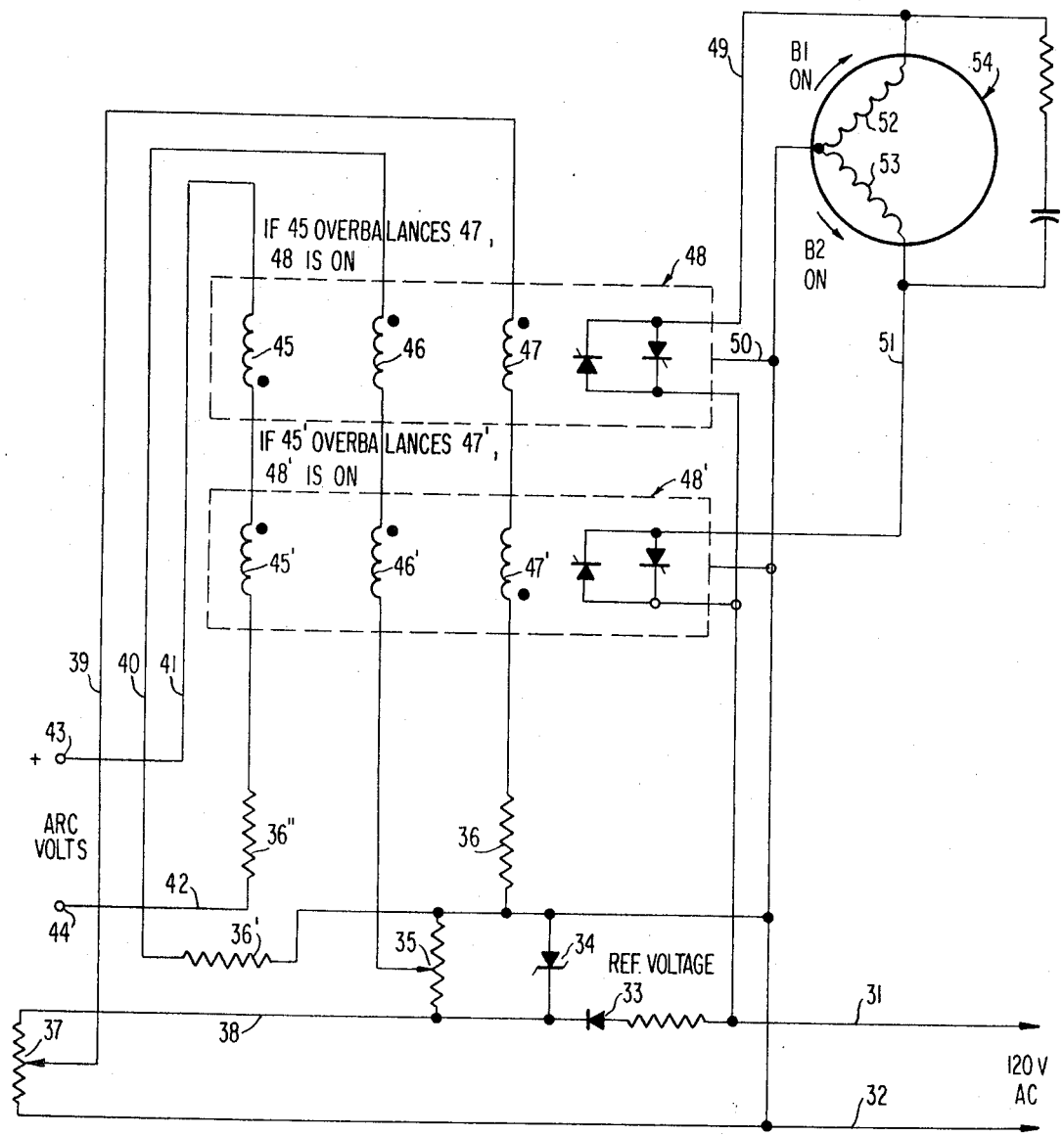
FIG. 4 is a schematic diagram of electrical control circuit for practice of this invention.

One form of voltage sensor suitably combined with a pair of solid state switches to operate an electrode drive is illustrated in FIG. 4. FIG. 5 shows one form of motor drive to advance and retract an electrode, in which a reversable motor is energized for each direction of rotation by the appropriate switch. A commercial form of sensor and magnetic amplifier is schematically illustrated in which the arc voltage may be applied across one winding about the saturable reactor of the magnetic amplifier. A second winding has a reference current proportional to a fixed voltage derived from a Zener diode, being connected to oppose the field in the core induced by current proportional to the voltage across the voltage sensing winding. A third winding may be employed with suitable potentiometer circuitry for modifying the effective reference current balanced against the first winding current. Current in the third winding efficiently controls sensivitivity and the voltage setting for which the magnetic amplifier is operative to close or open an associated solid state switch.

A second magnetic amplifier similar to the first is connected in the same manner except for reversal of connections to the voltage sensing and reference windings so that increase of arc voltage above a preset value in one amplifier effects the closing of one switch, and decrease below the set arc voltage in the other amplifier effects a closing of the second switch. These two switches are illustrated in FIG. 4 each operating to switch current to oppositely wound windings on the armature of the electrode driving motor for rotation in opposite directions according to which switch is operated.

A voltage sensor thus operates to close a first switch upon voltage exceeding a set value and a second switch upon the voltage decreasing below the set value, or a value slightly therebelow to provide a dead band or voltage range such as 0.5 volt. A reversable motor selectively energized by these switches provides for driving the electrode toward the work whenever the voltage is above the desired value and from the work whenever the voltage is below the desired value.

Referring now more particularly to the drawings it will be noted that FIG. 1 shows a general arrangement for practice of the invention in which 10 is a carriage for travel along track 11 having rails 12 for guiding and supporting wheels 13 by which the carriage may be operated to traverse the track at a uniform rate for such distance as may be required for any particular cut desired.

On carriage 10 is mounted a torch head 14 which includes an electrode motor driving mechanism and connects arc voltage to the electrode for cutting operation, the head 14 being electrically isolated from track 11. An electrode holder 15 holds and guides an electrode 16 as it is adjusted to make contact and then moved to a desired spacing from the workpiece, while extensions of electrode 16 are shown at 17 in supporting tube 18. An electrode adjusting mechanism 19 is within the torch head 14. Workpiece 20 is arranged adjacent track 11 and held stationary while head 14 is moved thereover. Grooves 21 and 22 illustrate cuts according to this method, being effected by separate passages of the electrode 16 thereover.

In carbon arc cutting of metals where a groove is to be formed the metal is melted by the electrical current and is removed by a high pressure jet as of air supplied by tube 23, from a source not shown, by way of control housing 24. A power supply is shown generally at 25 from which one terminal connects to the workpiece 20 and the second terminal to the electrode 16 via the housing 14. Control knobs 26 and meters 27 are shown on housing 24, by which the voltage and current are monitored. Air nozzle 28 is arranged in housing 14 by which air is passed from tube 23 into the arc for blowing metal from groove 21 as it is melted.

Figure 3:
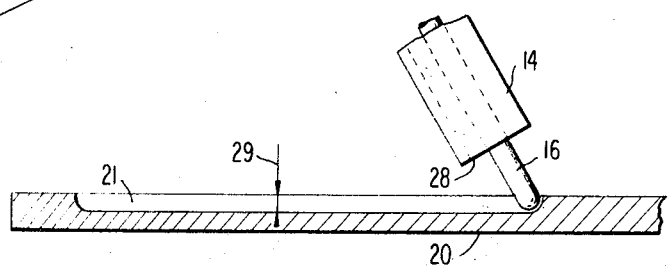
FIG. 3 is a longitudinal section of a typical groove produced by this invention.
Figure 2:
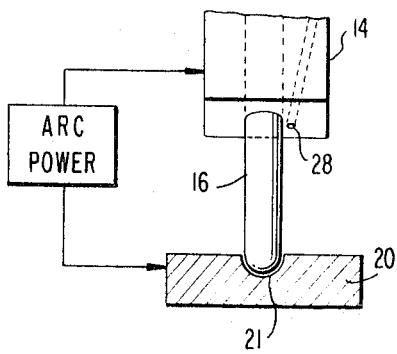
FIG. 2 is a transverse section of a typical groove produced by this invention.

In FIGS. 2 and 3 carbon electrode 16 is shown in positioned relation to groove 21 in workpiece 20 wherein the nozzle 28 directs a jet of gas at the workpiece throughout the arc area to blow out metal as it melts, leaving an arc space which is relatively short compared with the depth of cut. A cut of three-eighths inch to three-fourths inch may be made to a tolderance of 0.025 inches, or better. The electrode extends into the groove during operation such that the arc length is a small fraction of the depth of cut.

Electrode 16 is advanced in accordance with operation of motor 54 having gears 55 driving grooved electrode holding wheels 56 and 56' to advance the electrode longitudinally for operation of motor 54 in one direction and to withdraw electrode 16 for opposite rotation of motor 54.

FIG. 4 illustrates one form of magnetic amplifier and solid state switch suitable for practice of this invention. Leads 31 and 32 connect to a suitable AC voltage supply, although a DC supply could be employed with minor modifications of circuitry. When AC voltage is selected, rectifier 33 provides DC voltage for the circuitry, which may be of pulsating nature rather than continuous. A suitable voltage reference may be a Zener diode 34 and a resistor connected between leads 31 and 32 to supply a voltage reference at the same time the power line voltage is applied to the control apparatus. A sensitivity adjusting potentiometer 35 is connected across diode 34 to control current to a third or sensitivity controlling winding in the magnetic amplifier as above described. Resistors 36 and 36' serve as selectable control means for governing the current or voltage applied across the reference current and sensitivity adjusting coils, to provide current balance in the range of 35 to 45 volts, preferably 38 to 40 volts. Potentiometer 37 is connected across the voltage supply as from lead 32 to the rectifier 33 by way of lead 38 providing a source of variable voltage by way of lead 39 to effect an adjusted reference current opposing the current in the windings sensing the arc voltage. Lead 40 extends from lead 32 via resistor 36' to the sensitivity adjusting winding at the end opposite the connection to potentiometer 35. Leads 41 and 42 extend from terminals 43 and 44 which are connected effectively to the two sides of the arc as at electrode 16 and workpiece 20 thus connecting the arc terminals to the ends of the voltage sensing windings 45 and 45' of the two magnetic amplifiers. The sensitivity controlling windings are shown at 46 and 46', respectively, and the reference current windings at 47 and 47', respectively.

Suitable adjustments are preferably included to prevent either a simultaneous operation of both switches 48 and 48' or a hunting oscillation of the electrode positioner due to too rapid shifting between clockwise and counter-clockwise rotation of motor 54. Electrode adjustment is made sufficiently rapid to permit the electrode to follow the contours of the material being cut as in a warped plate or a workpiece of irregular shape. A cylindrical workpiece rotated and longitudinally advanced at a desired pitch permits rough cutting of threads on the cylinder, and at a speed many times the cutting rate of known machining operations.

Voltage sensing and electrode positioning by electronic means as illustrated can be made to respond in a few thousandths of a second, e.g., 0.005 or better to control depth of cut to 0.025 inch or better.

As a carbon electrode is consumed in the arc those portions closest to the workpiece are most rapidly consumed, so that the electrode termination is given a smoothly rounded profile and the workpiece is cut to a corresponding profile of slightly larger curvature. Current density may be adjusted to a relatively higher value or the workpiece may be moved more slowly past the arc position to effect a deeper cut. In relatively deep cutting the sides of the groove are substantially straight and of a V shape somewhat wider at the top than the diameter of the electrode rather than arcuate as in a cut shallower in relation to electrode diameter. Operating arc voltage level is variable according to the setting of potentiometer 37 and/or by changing resistors 36, 36'.

It will be appreciated that both current and voltage may be adjusted by use of apparatus as described, while retaining the advantage of uniformity of cutting depth and high rate of metal removal for refractory metals and alloys which are too hard for conventional machining, but are cut slowly by a diamond grinding or scratching procedure. While two magnetic amplifiers are illustratively used with solid state switches to control or switch operating current for advance and retract rotations of the electrode adjusting motor, the invention is not limited as to specific sensor or motor means used to convert sensed excess arc voltage into an electrode advancing motion or deficient arc voltage into an electrode retracting motion.

Various modifications may be made in the practice of the invention without departing from the invention which is intended to be limited in scope only in accordance with the appended claims.

What is claimed is:

1. The method of controlling the depth of a cut relative to the surface of a workpiece by a carbon arc supplied from a source having a steeply drooping voltage characteristic and a gas jet for removal of molten metal which comprises, controlling the spacing of the electrode from the workpiece directly with variations in the current in the arc detected as inverse voltage output variations from said source while advancing the electrode along the surface to be cut.

2. The method of controlling the depth of metal removed from a workpiece by melting in a carbon arc between an electrode and the workpiece, the arc being supplied from a current source having a steeply drooping voltage characteristic, comprising the steps of sensing voltage applied between said electrode and workpiece as departures above and below a value in the range of 38 to 40 volts,
mechanically advancing the electrode toward the workpiece in response to sensed departures above said value,
mechanically withdrawing the electrode from the workpiece in response to sensed departures below said value,
blowing from the arc metal as it is melted in the arc,
moving the electrode parallel with the surface of the workpiece at a uniform rate to effect a controlled depth of melting governed by said advancing and withdrawing of the electrode in response to said departures of arc voltage from said value,
said current source having an open circuit voltage at least substantially 45 volts and said departures above and below said value being sensed when substantially exceeding 0.2 volt.

3. The method of claim 1 wherein a current source for said arc has a drooping voltage characteristic as the load current increases including the step of varying said current as a function of said drooping voltage characteristic.

4. The method of claim 3 wherein the open circuit source voltage is not substantially less than 45 volts and the source voltage at controlled load conditions is substantially less than 40 volts.

5. The method of claim 4 wherein the source voltage is controlled within the range of 38–40 volts as a function of load current.

6. The method of controlling the uniformity of depth of cutting of a metal plate in a carbon arc blown by a gas jet in which the arc is supplied from a current source having a steeply drooping voltage characteristic as the load current increases, comprising the steps of measuring an indication of said load current which varies in magnitude as the arc spacing changes,
increasing said spacing in response to a measured indication of rising current, and
decreasing said spacing in response to an indication of decreasing current,
said spacing being changed in amount to maintain said source voltage within a narrow range having an upper limit substantially below the open circuit voltage of said source.

7. The method of claim 6, wherein said source has a voltage variation substantially exceeding a linear relation to said load current and said steps of increasing and decreasing said spacing being proportional to a voltage representation of said indications of current to effect spacing and load current regulation at enhanced sensitivity.

8. The method of claim 6, said steps of increasing and decreasing said spacing being adjusted to maintain current flow through the arc substantially constant according to feedback proportioned to source voltage variations.

9. The method of claim 6, said steps of increasing and decreasing said spacing being adjusted to vary said source voltage inversely as current drawn from said source to maintain arc current substantially constant.

10. In a carbon electrode gas jet cutting torch adapted for movement along a workpiece and supplied with current from a source having a steeply drooping voltage characteristic as load current increases, said torch being adjusted to draw a mean load current from the source at a source voltage not approximating open circuit voltage for that generator wherein arc current is a function of electrode spacing from the workpiece, magnetic amplifier means for detecting departures from said mean load current, and
electromechanical means for advancing the electrode toward the workpiece and retracting the electrode from the work-piece according to said detected departures in load current in directions, respectively, to counteract said departures in load current.

11. In a torch according to claim 10, said means for advancing and retracting the electrode being operative in degree of motion proportioned to detected changes in said source voltage according to load changes and more than proportionally to resistance variations in the arc.

* * * * *